United States Patent [19]

Sakaguchi et al.

[11] Patent Number: 4,789,110
[45] Date of Patent: Dec. 6, 1988

[54] METHOD AND DEVICE FOR WINDING MAGNETIC TAPE USING MAGNETIC ALIGNMENT

[75] Inventors: Masaaki Sakaguchi; Kazuo Kubota, both of Kanagawa, Japan

[73] Assignee: Fuji Photo Film Co., Ltd., Kanagawa, Japan

[21] Appl. No.: 33,698

[22] Filed: Apr. 3, 1987

[30] Foreign Application Priority Data

Apr. 4, 1986 [JP] Japan .................................. 61-76666

[51] Int. Cl.⁴ .......................................... B65H 18/26
[52] U.S. Cl. ................................ 242/67.1 R; 242/76; 360/66; 226/93; 226/95
[58] Field of Search ............... 242/67.1 R, 76, 78, 242/78.1, 179, 186; 226/93–97; 360/66

[56] References Cited

U.S. PATENT DOCUMENTS 4,343,441 8/1982 Graham .......................... 242/68.1
4,512,527 4/1985 Rehklav et al. .................. 242/56 R Primary Examiner—Stuart S. Levy
Assistant Examiner—Steven M. duBois
Attorney, Agent, or Firm—Sughrue, Mion, Zinn, Macpeak & Seas

[57] ABSTRACT

A method and apparatus for winding a magnetic tape on a reel. A magnetic field is applied along the width of the wound tape to pull the magnetic tape against a flange. Air is jetted between the tape layers at the point where the tape is wound so that the layers can more freely move relative to each other. Air pressure is reduced at another point around the wound tape so as to deplete the air so entrained between the layers.

11 Claims, 3 Drawing Sheets

METHOD AND DEVICE FOR WINDING MAGNETIC TAPE USING MAGNETIC ALIGNMENT

BACKGROUND OF THE INVENTION

1. Field of the Invention

The present invention relates to a method and a device for winding a magnetic tape, such as winding a magnetic tape of prescribed length form a source roll of a magnetic tape to a small tape winding body, rewinding a magnetic tape from a tape winding body to another tape winding body, winding a magnetic tape of large width for a source "roll", and winding a magnetic tape of large width to a plurality of tape winding bodies while slitting the tape.

BACKGROUND OF THE INVENTION

A process of manufacturing a magnetic tape such as an audio cassette tape, a video cassette tape, a memory tape or a broadcasting video tape includes a step of winding a magnetic tape of prescribed length from a source roll of a large-length tape to a small tape winding body such as a reel and a hub, a step of rewinding a magnetic tape from a tape winding body to another tape winding body, a step of winding a magnetic tape of large width as a source tape, a step of winding a magnetic tape slit from another magnetic tape, and so forth. When the magnetic tape is wound on the tape winding body in the process of the winding or the rewinding, the tape may vibrate in the direction of the thickness of the tape and this vibration can fluctuate due to the physical properties of the magnetic tape and those of the tape winding body so that each side edge of the tape wound on the winding body is unneatly overlaid on itself. The higher that the speed of the winding is, the more unneatly the side edge is overlaid on itself.

A magnetic tape whose side edge is unneatly overlaid on itself as described above has problems that the external appearance of the wound tape housed as a commercial product in a magnetic tape cassette is bad. Furthermore, the side edge is likely to be damaged to resulting in various troubles such as the deterioration of the electromagnetic converting properties of the tape. The unneat overlaying is a serious drawback, particularly for a magnetic video tape for high-density recording, because an audio signal or a tuning signal is recorded near the side edge of the tape. For these reasons, in a conventional process of manufacturing a magnetic tape, the wound states of all magnetic tapes are visually inspected or the like after a winding process or a rewinding process. 8ince the inspection takes much time and money, the inspection is a major disadvantage in the magnetic tape manufacturing process.

Conventional systems, which are shown in FIGS. 1 and 2 and which accomplish what is called neat winding, have been adopted to wind a magnetic tape of low neatwinding yield in order to improve the wound state of the tape to reduce the necessity of its inspection. FIGS. 1 and 2 show perspective schematic views of tape winding bodies 2 and the vicinity thereof.

In the conventional system shown in FIG. 1, an endless flexible belt 11 made of rubber, polyimide or the like and rotatably supported by roller 12, 13 and 14 is revolved together with the magnetic tape T and elastically pushes the magnetic side of the tape under relatively high pressure in the radial direction of the tape winding body 2 to neatly wind the tape.

In the conventional system shown in FIG. 2, a belt 15 made of a relatively soft nonwoven fabric or the like is provided between one flange of the tape winding body 2 and one side edge of the magnetic tape T to push the side edge of the tape T under relatively high pressure while the belt is supported by a roller 17 or the like and wound at a low constant speed from a belt send-out member 16 to a belt winding member 18 so as to neatly wind the tape.

However, since the belts 11 and 15 are placed in direct contact with the magnetic tape T in the above-mentioned systems, there are various problems that the magnetic layer of the tape is worn or the fibers of the nonwoven fabric come off to locally hinder recording on the tape, inappropriate pressure acts to deform the tape or damage its side edge, and so forth. For that reason, the systems do not function properly. In addition, since the wear and tear of the neat winding systems are large, they have disadvantages with regard to their cost and maintenance as well. The constitution of each of the systems needs to be such that the tape winding body 2 is moved between at least a working position and a nonworking position when it is replaced. The constitution makes a magnetic tape winding device complicated and renders it relatively time-consuming to replace the tape winding body 2. The period of time required for the movement of the tape winding body 2 hinders the enhancement of productivity.

Meanwhile, a magnetic tape winding device was recently proposed in the Japanese Patent application (OPI) No. 51642/86 (the term "OPI" as used herein means an "unexamined published application"). In the device illustrated in FIG. 3, a winding drive shaft 30 is removably coupled to the winding hub 41 of a winding reel 42 comprising the hub 41 and a flange 42. At least one magnet 31 is provided to face the wound side edge of a magnetic tape across the flange 42 while the tape is wound on the reel 40 so as to improve the wound state of the tape. However, the magnet 31 provided around the shaft 30 has a problem that the wound state of the tape is worse at its central portion near the winding hub 41 than at the peripheral portion of the tape. That is because the form of the magnet 31 is limited by the shaft 30. The magnet 31 is made annular so that the directions of the lines of magnetic force thereof are nonuniformly distributed near the central portion of the winding reel 40 due to the hollow central portion of the magnet. The magnetic flux density near the center of the reel 40 is so low that the magnetic force which pulls the magnetic tape T toward the flange 42 is unstable and weak at the initial stage of the winding of the tape. In addition, if the friction between the tape layers is relatively large, the magnetic force applied to the magnetic tape must be extremely large. Accordingly, the magnet must be increased in size and the electric consumption must be enlarged in the case of an electromagnet.

SUMMARY OF THE INVENTION

The present invention was made in consideration of the above-mentioned circumstances.

Accordingly, it is an object of the present invention to provide both a method and a device for neatly winding a magnetic tape on a tape winding body even if the physical properties of the tape are irregular.

It is another object of the present invention to provide a method and a device for winding a magnetic tape without complicating the device and degrading the quality of the tape as in the above-described neat winding systems so as to improve the working properties of the process of the winding of the tape.

In order to attain the above objects, according to an aspect of the present invention, the magnetic tape take-up method is featured in that, when a magnetic tape is taken up on a tape winding body, a magnetic field is applied to the magnetic tape in the direction of a width of the magnetic tape at least in the vicinity of the tape winding body. Simultaneously, the air pressure is increased at the inner side of the magnetic tape at a tape entrance portion where the magnetic tape is wound onto the tape winding body. Also, the air pressure is reduced at a place apart from the tape entrance portion along the circumference of the wound tape surface.

According to another aspect of the present invention, the magnetic tape take-up apparatus for taking up a magnetic tape on a tape winding body while rotating the tape winding body comprises an air blower for blowing air to the inner side of the magnetic tape at a tape entrance portion where the magnetic tape is wound onto the tape winding body, air sucking means for reducing the air pressure at a place apart from the tape entrance portion along the circumference of the wound tape surface, and magnetic means for generating a magnetic field for energizing the magnetic tape in the direction of width of the magnetic tape at least in the vicinity of the tape winding body.

DETAILED DESCRIPTION OF THE PREFERRED EMBODIMENT

An embodiment of the apparatus by which the method according to the invention is realized will be described in detail hereunder.

Figure 1:
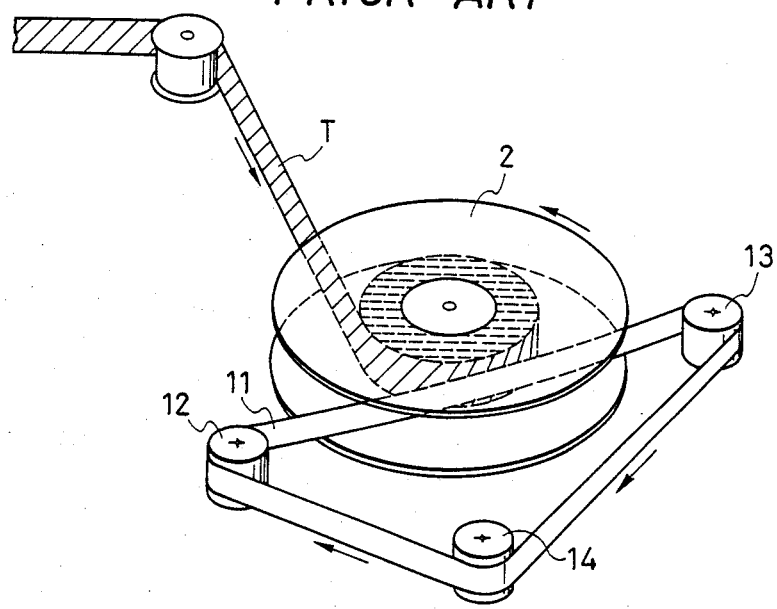
FIGS. 1 and 2 are schematic perspective views respectively showing two conventional take-up apparatus.
Figure 2:
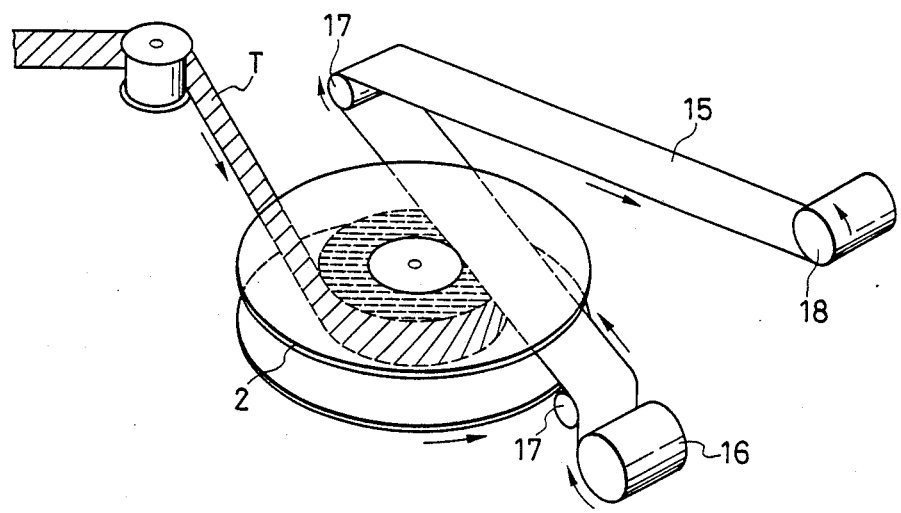
Figure 3:
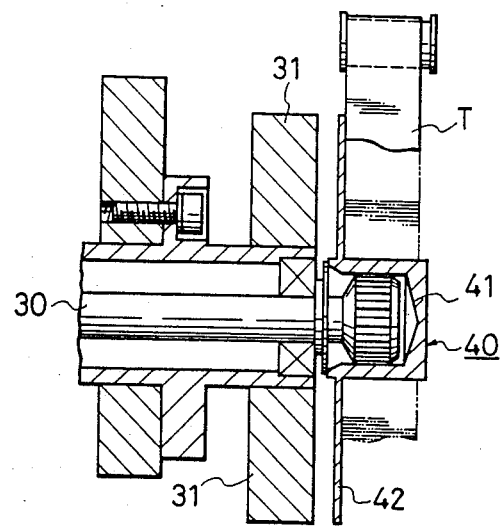
FIG. 3 is a sectional view showing a part of the take-up apparatus in a prior art device.
Figure 4:
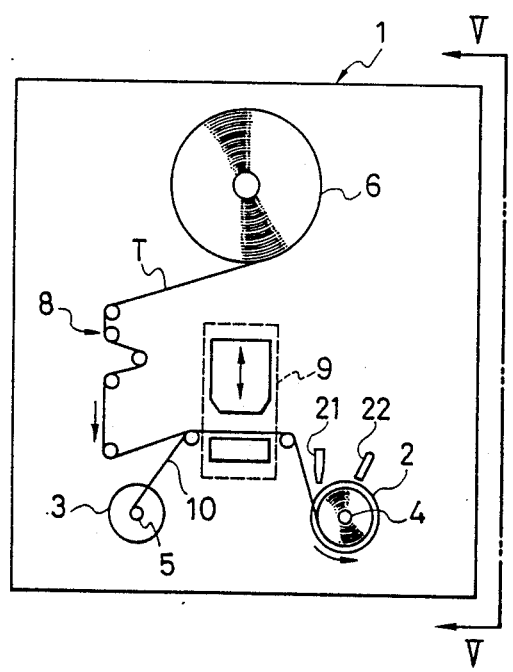
FIG. 4 is a schematic front view of an embodiment of the winding apparatus in accordance with the present invention.
Figure 5:
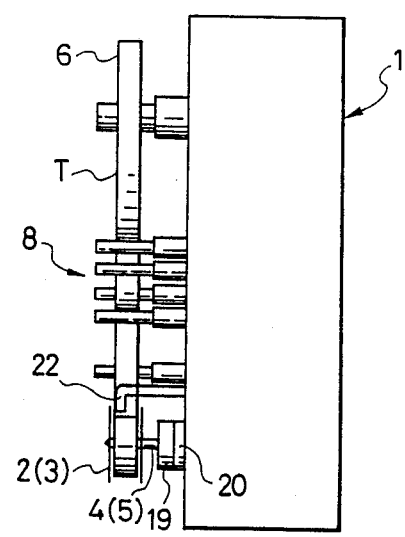
FIG. 5 is a schematic side view of the apparatus of FIG. 4.

FIG. 4 is a schematic plan view of an embodiment of the magnetic tape take-up apparatus according to the invention, and FIG. 5 is a side view in the direction of the line V—V of FIG. 4. For example, the take-up apparatus 1 is used in a method in which a magnetic tape T is wound on a pair of tape winding bodies 2 and 3 (hereinafter referred to as "tape reels") to be incorporated in a video tape cassette.

In the following the operation of the take-up apparatus 1 is briefly described.

At first, the tape reels 2 and 3 are connected by a leader tape 10 having a predetermined length (half of which is illustrated in FIG. 4). After the tape reels 2 and 3 are respectively mounted onto rotary shafts 4 and 5 to be rotationally driven in the take-up apparatus, the leader tape 10 is cut off about in the middle. The cut end of one part of the leader tape 10 connected to the take-up tape reel 2 is spliced with a bonding tape or the like to a forward end of a coiled raw magnetic tape 6 mounted in advance. The magnetic tape T is taken up by a predetermined length on the take-up tape reel 2 and then is cut off. Thereafter, the cut end of the magnetic tape T wound on the take-up tape reel 2 is spliced to the other cut end of the other part of the leader tape 10 connected to the other tape reel 3.

The cutting of the leader tape 10 and the magnetic tape T and the splicing between the leader tape 10 and the magnetic tape T are carried out by cutting and bonding means 9 provided with a tape end holding member, a cutter, a bonding tape, and so on. The magnetic tape T fed from the reel of raw tape 6 is wound on the take-up tape reel 2 through a transport system 8 comprising guide pins and guide rollers. The cutting and bonding means 9 are not shown in FIG. 5.

Although the above description is applicable to the conventional apparatus, the apparatus according to the invention is featured in the mount portion of the tape reel 2. In other words, it is featured in the fact that a permanent magnet 19, a blast pipe 21 acting as means for blowing air onto the magnetic tape T, and a suction pipe 22 as a means for sucking air are provided in the vicinity of the tape take-up reel 2 which takes up the magnetic tape T.

Figure 6:
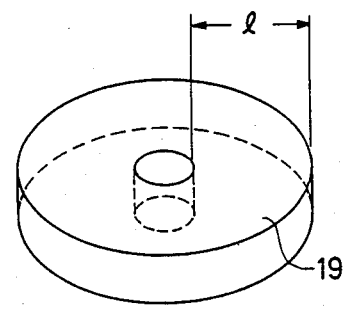
FIG. 6 is an enlarged perspective view of one of the magnets depicted in FIG. 5.

The permanent magnet 19, for example shaped like a doughnut as shown in FIG. 6, is attached to the take-up apparatus body through a support 20 so as to surround the shaft 4. The magnetic field of the permanent magnet 19 is established substantially in the direction of the tape width to thereby apply an attractive force to the magnetic tape T in the direction of width of the tape.

Figure 7:
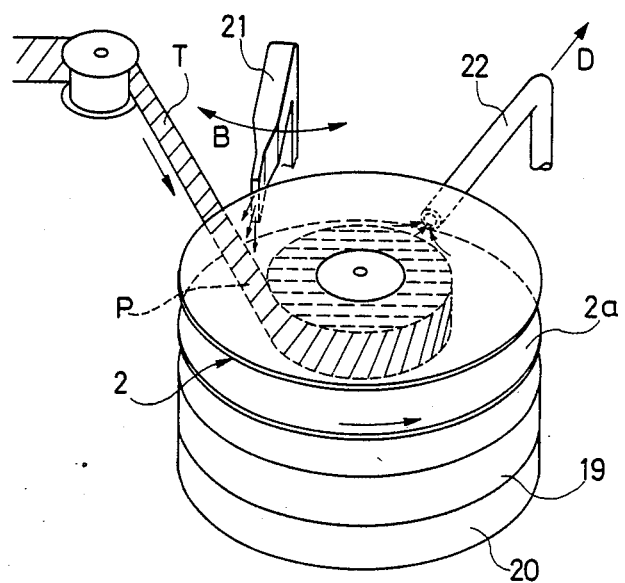
FIG. 7 is a partly enlarged perspective view of the apparatus of FIG. 5.

The blast pipe 21, which is connected to a compressor or the like, is provided to blow air to the inner side of the tape in a tape entrance portion P where the magnetic tape T is rolled in onto the tape reel 2. The blast port of the blast pipe 21 of, for example, oblong shape having longer sides substantially equal to the tape width, is constructed such that air is uniformly blown to the side the tape T. Furthermore, the blast pipe 21 may be fixed with the blast port opening toward an appropriate direction or may be movably provided so that the air blowing direction can be freely changed, for example, as shown by the arrow B of FIG. 7.

On the other hand, the suction pipe 22, which is connected to a vacuum pump or the like, is provided at a place to make an appropriate angle (about 120°) from the tape entrance portion P. The suction port of the suction pipe 22 is near the circumference of the magnetic tape T which has been wound, and the suction port is formed so as to be movable outwardly from a radius of the reel (as shown by the arrow D of FIG. 7) corresponding to the increase in diameter of the wound tape.

It is a matter of course that the rotary shaft 4 is coupled to any driving means, such as an electric motor or the like, so as to be driven to rotate by the driving means.

In the case where the magnetic tape T is wound by the take-up apparatus 1 arranged in such a manner as described above, the air rolled in together with the magnetic tape T increases in volume owing to the air blowing of the blast pipe 21 to thereby form a relatively thick air layer between the tape layer which is currently wound and another tape layer which has already been wound. The magnetic tape T is attracted toward a magnet-side flange 2a owing to the permanent magnet 19.

Accordingly, the magnetic tape T smoothly moves toward the flange 2a while partially floating due the formation of the air layer. Remaining air behind the tape is forcibly sucked by the suction pipe 22. Accordingly, adjacent tape layers come into close contact with each other.

As a result, the tape edge can be trued up without disorder in the direction of tape width, and the good winding condition can be maintained because problems after winding are prevented.

Particularly, when the magnetic tape T is wound at a high speed, the air is naturally rolled in together with the magnetic tape T to thereby form an air layer between adjacent tape layers. The air layer can be more securely formed by the air forcedly blown from the blast pipe 21.

The intensity of magnetic force of the permanent magnet 19 is not limited specifically. Although the intensity of magnetic force can be established under consideration of various conditions, such as the tape tension at winding, the kind of magnetic tape T, the distance between the magnet 19 and the magnetic tape T, the winding speed (tape running speed), the influence of the magnetic field on the magnetic tape T, and the like, it can be established at a small value because the air layer is additionally formed by the blast pipe 21. Accordingly, with a small applied magnetic field the magnetic erasing process after winding can be omitted. Furthermore, both the air blowing pressure and air sucking pressure are not limited specifically and can be suitably established under the aforementioned conditions. It is a matter of course that the air pressures are respectively freely adjustable.

Although the embodiment shows the case where the suction pipe 22 is fixed at a place to make a predetermined angle from the tape entrance point P of the magnetic tape T (but is movable in the direction of a radius of the reel), the invention is not limited to the embodiment. For example, the suction pipe 22 may be movable along the circumference of the reel. In this case, the position of the suction pipe 22 can be suitably determined under consideration of various conditions, such as the winding speed, the air blowing pressure, the air sucking pressure, the intensity of magnetic field, and the like.

Although the embodiment shows the case where the doughnut-like permanent magnet 19 is used for applying to the magnetic tape T a magnetic field in the direction of the tape width, it is to be understood that the invention is not limited thereto and that various modifications in the form and position of the magnet can be made. For example, the direction of magnetic field applied to the magnetic tape T may be inclined to the tape width. In short, the form, position, and other points of the magnet are not limited specifically, as long as the magnet has its magnetic force which can act on the magnetic tape T to be biased in the direction of the tape width.

Although the embodiment shows the case where a permanent magnet is used as a magnet, it is to be understood that the invention is not limited thereto and that an electromagnet may be used as a magnet. In the case where an electromagnet is used, magnetic force of the electromagnet can be freely changed corresponding to the change of the current following therein.

The invention is not limited to the aforementioned embodiment. For example, the invention is applicable to the case where a wide raw tape is divided into a plurality of raw tapes usable as manufactured articles to be wound on the tape reels.

The term "magnet" used in this specification is not limited to "permanent magnet" or "electromagnet" as described above, and generically represents "magnetic field generating means", for example, inclusive of the concept "solenoid".

As described above in detail, according to the invention, when a magnetic tape is taken up onto a tape winding body, not only magnetic force is applied to the magnetic tape to force the tape in the direction of its tape width by use of a magnetic field but also entrained air rolled in together with the magnetic tape T is increased in amount at the tape entrance portion P of the tape winding body so that the magnetic tape T can easily move in the energized direction due to the magnetic force compared with the prior art in which magnetic force is merely applied to the magnetic tape. Accordingly, even if the magnetic force is relatively weak, the edge of the magnetic tape T which has been wound can be trued up in a very good state. Furthermore, the remaining part of the entrained air temporarily increased in amount between the tape layers can be forcibly exhausted to thereby make the tape layers come into close contact with each other, so that the improved appearance of the magnetic tape T provided by the magnetic force does not degrade, and the good winding condition can be maintained. Moreover, according to the invention, the good tape winding condition can be secured even if the magnetic force is weak, resulting in no problem of increase in size of the magnet, or the like.

In addition, according to the invention, there occurs no trouble due to contact which has often occurred in the prior art, for example, breakage of the tape, injury of the tape edge, injury of the magnetic surface, and so on, so that the quality of the magnetic tape can be improved. Furthermore, dust or the like attached on the magnetic tape can be removed by the air blowing and air sucking, so that the quality of the magnetic tape can be more improved.

Consequently, according to the invention, it is possible to improve both the quality of the magnetic tapes and the manufacturing productivity in tape taking-up process, and it is possible to provide a rapid progress of magnetic tape take-up method and an apparatus therefor.

What is claimed is:

1. A tape winding method, comprising the steps of:
   rotating a tape winding onto which a magnetic tape is attached about its axis, whereby said magnetic tape is wound in concentric layers onto on said tape winding body;
   applying a magnetic field at least in a vicinity of said rotary tape winding body to said wound tape and at least partially in a direction of a width of said wound magentic tape for aligning edges of the wound tape concentric layers; and
   establishing a positive air presssure at a radially inner side of said magnetic tape at a tape entrance portion where said magnetic tape is wound onto said tape winding body with respect to air pressure at a place along an outer circumference of said wound tape, apart from said tape entrance portion, said establishing step being independent of said winding step, whereby a relatively thick air layer is created between the tape layer being wound and the layer already wound such that the magnetic tape being wound up moves smoothly under the influence of the magnetic field while partially floating due to the air layer.

2. A tape winding method, comprising the steps of:
rotating a tape winding bidy onto which a magnetic tape is attached about its axis, whereby said magnetic tape is wound in concentric layers onto said tape winding body;
applying a magentic field at least in a vicinity of said rotating tape winding body to said wound tape and at least partially in a direction of a width of said wound magnetic tape to align edges of the wound tape concentric layers; and
increasing air pressure at a radially inner side of said magentic tape at a tape entrance portion where said magentic tape is wound onto said tape winding body, whereby a relatively thick air layer is created between the tape layer being wound and the layer already wound such that the magnetic tape being wound up smoothly under the influence of the magnetic field while partially floating due to the air layer.

3. A tape winding method as recited in claim 2, further comprising the step of reducing the air pressure along the outer circumference of the aound tape at a place apart from said tape entrance portion to cause adjacent tape layers to come into close contact with each other.

4. A magnetic tape take-up apparatus, comprising:
a tape winding body to which a magnetic tape is attached;
means for rotating said tape winding body about its axis, whereby said magnetic tape is wound into said tape winding body in concentric layers;
magnetic means for generating a magnetic field in a vicinity of said tape winding body for application to said wound tape and at least partially in a direction of a width of said wound magnetic tape and for magnetically driving said tape along the direction of said width of said wound magentic tape; to thereby align the edges of the concentric layers of tape about said tape winding body; and
means for establishing a positive air pressure at a radial inner side of said magnetic tape at a tape entrance portion where said magentic tape is wound onto said tape winding body with respect to air pressure along an outer circumference of said wound tape at a place apart from said tape entrance portion to create a relatively thick air layer between the tape layer being wound and the layer already wound, whereby the magnetic tape being wound up moves smoothly under the influence of the magnetic field while partially floating due to the air layer, said establishing means operating independently of said rotating means.

5. A magnetic tape take-up apparatus, comprising:
a tape winding body to which a magnetic tape is attached;
means for rotating said tape winding body about its axis, whereby said magnetic tape is wound in concentric layers onto said tape winding body;
magnetic means for generating a magnetic field a vicinity of said tape winding body and for applying said magnetic field to said wound tape and at least partially in a direction of a width of said wound magnetic tape, whereby said magnetic field drives said magnetic tape in a direction of a width of said wound magnetic tape; such that the edges of the concentric layers of said magnetic tape are aligned; and
air blowing means for blowing air against a radially inner side of the magnetic tape at the tape entrance portion where said magnetic tape is wound onto said tape winding body to create a relatively thick layer between the tape layer being wound and the layer already wound, whereby the magnetic tape being wound up moves smoothly under the influence of the magnetic field while partially floating due to the air layer.

6. A magnetic tape take-up apparatus as recited in claim 5, further comprising air sucking means for reducing the air pressure along the outer circumference of said wound tape at a place apart from said tape entrance portion to cause adjacent tape layers to come into close contact with each other.

7. A magnetic tape take-up apparatus as recited in claim 6, wherein said air sucking means are movable in a radial direction of said tape winding body.

8. A magnetic tape tale-up apparatus as recited in claim 6, wherein said air sucking means are movable along the circumference of said tape winding body.

9. A magnetic tape take-up apparatus as recited in claim 7, wherein said air sucking means are movable along the circumference of said tape winding body.

10. A tape winding method comprising the steps of:
rotating a tape winding body to which a magnetic tape is attached about its axis, whereby said magnetic tape is wound in concentric layers onto said tape winding body;
increasing air pressure at a radially inner side of said magnetic tape at a tape entrance portion where said magnetic tape is wound onto said tape winding body to create a relatively thick air layer between said tape layer being wound and the layer already wound such that the magnetic tape being wound up partially floats due to the air layer; and
reducing the air pressure along an outer circumference of said wound tape at a place apart from said tape entrance portion to cause adjacent tape layers to come into close contact with each other during tape wind up.

11. A magnetic tape take-up apparatus comprising:
a tape winding body to which a magnetic tape is attached;
means for rotating said tape winding body about its axis, whereby said magnetic tape is wound onto said tape winding body in concentric layers;
air blowing means for blowing air against a radially inner side of said magnetic tape at a tape entrance portion where said magnetic taper is wound onto said tape winding body to create a relatively thick air layer between the tape layer being wound and the layer already wound such that the magnetic tape partially floats due to air layer during winding up; and
air sucking means positioned along an outer circumference of said wound tape at a place apart from said tape entrance portion to cause adjacent tape layers to come into close contact with each other furing tape wind up.

* * * * *